(12) United States Patent
Sun et al.

(10) Patent No.: US 11,430,466 B2
(45) Date of Patent: Aug. 30, 2022

(54) SOUND SOURCE DETECTION AND LOCALIZATION FOR AUTONOMOUS DRIVING VEHICLE

(71) Applicant: Baidu USA LLC, Sunnyvale, CA (US)

(72) Inventors: Hongyi Sun, Sunnyvale, CA (US); Kecheng Xu, Sunnyvale, CA (US); Qi Luo, Sunnyvale, CA (US); Zejun Lin, New York, NY (US); Wei Wang, Buffalo, NY (US); Wesley Reynolds, Sunnyvale, CA (US); Jiangtao Hu, San Jose, CA (US); Jinghao Miao, San Mateo, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 21 days.

(21) Appl. No.: 17/248,196

(22) Filed: Jan. 13, 2021

(65) Prior Publication Data
US 2022/0223170 A1    Jul. 14, 2022

(51) Int. Cl.
| | |
|---|---|
| *H04B 1/00* | (2006.01) |
| *G10L 25/51* | (2013.01) |
| *H04R 1/08* | (2006.01) |
| *H04R 1/40* | (2006.01) |
| *G06N 20/00* | (2019.01) |
| *G06N 5/04* | (2006.01) |
| *G05D 1/02* | (2020.01) |
| *H04R 3/00* | (2006.01) |

(52) U.S. Cl.
CPC ............ *G10L 25/51* (2013.01); *G05D 1/0255* (2013.01); *G06N 5/04* (2013.01); *G06N 20/00* (2019.01); *H04R 1/08* (2013.01); *H04R 1/406* (2013.01); *H04R 3/005* (2013.01); *H04R 2499/13* (2013.01)

(58) Field of Classification Search
CPC ........................................................ H04B 1/00
See application file for complete search history.

(56) References Cited

U.S. PATENT DOCUMENTS

2018/0261237 A1*  9/2018  Moore ................... G10L 25/51
2018/0299534 A1* 10/2018  LaChapelle ............ G01S 17/89
(Continued)

*Primary Examiner* — Olisa Anwah
(74) *Attorney, Agent, or Firm* — Womble Bond Dickinson (US) LLP (57) ABSTRACT

Systems and methods for sound source detection and localization utilizing an autonomous driving vehicle (ADV) are disclosed. The method includes receiving audio data from a number of audio sensors mounted on the ADV. The audio data comprises sounds captured by the audio sensors and emitted by one or more sound sources. Based on the received audio data, the method further includes determining a number of sound source information. Each sound source information comprises a confidence score associated with an existence of a specific sound. The method further includes generating a data representation to report whether there exists the specific sound within the driving environment of the ADV. The data representation comprises the determined sound source information. The received audio data and the generated data representation are utilized to subsequently train a machine learning algorithm to recognize the specific sound source during autonomous driving of the ADV in real-time.

24 Claims, 8 Drawing Sheets

(56) References Cited

U.S. PATENT DOCUMENTS

| | | | | |
|---|---|---|---|---|
| 2019/0383631 A1* | 12/2019 | Bigio | ............... | G06V 20/59 |
| 2020/0025904 A1* | 1/2020 | Buck | ............... | G08G 1/0965 |
| 2020/0031337 A1* | 1/2020 | Soltanian | ............... | H04R 1/406 |
| 2020/0348687 A1* | 11/2020 | Paudel | ............... | G01S 5/30 |
| 2021/0031757 A1* | 2/2021 | Boulton | ............... | B60W 60/001 |
| 2021/0103747 A1* | 4/2021 | Moustafa | ............... | G06K 9/6288 |
| 2021/0109187 A1* | 4/2021 | Watt | ............... | G01S 3/8055 |
| 2021/0302987 A1* | 9/2021 | Chebiyyam | ............... | G01S 3/802 |
| 2021/0372796 A1* | 12/2021 | Lin | ............... | G01S 13/931 |
| 2021/0385573 A1* | 12/2021 | Popa | ............... | H04R 1/406 |
| 2022/0024484 A1* | 1/2022 | Armstrong-Crews | ... | G06N 5/04 |

\* cited by examiner

SOUND SOURCE DETECTION AND LOCALIZATION FOR AUTONOMOUS DRIVING VEHICLE

TECHNICAL FIELD

Embodiments of the present disclosure relate generally to operating autonomous driving vehicles. More particularly, embodiments of the disclosure relate to sound source detection and localization for an autonomous driving vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, the operations of motion planning and control generally require perception of surrounding obstacles or objects. They also need real-time detection of a specific sound source (e.g., emergency vehicle) and make real-time responses to the sound source. While there exist different solutions with respect to the detection and localization of such sound source, the several separate steps in those solutions, however, are time consuming and fail to take every clues into considerations.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Aspects of the application relate to a one-shot sound detection (e.g., siren sound detection) and localization algorithm that can perform the detection, localization, and tracking of one or more sound sources (which may be referred to as "you only hear once" (YOHO)).

According to one aspect, a computer-implemented method for sound source detection and localization utilizing an autonomous driving vehicle (ADV) while the ADV is operating within a driving environment is described. The method includes receiving audio data from a number of audio sensors mounted on the ADV. The audio data comprises sounds captured by the audio sensors and emitted by one or more sound sources. Based on the received audio data, the method further includes determining a number of sound source information. Each sound source information comprises a confidence score associated with an existence of a specific sound. The method further includes generating a data representation to report whether there exists the specific sound within the driving environment of the ADV. The data representation comprises the determined sound source information. The received audio data and the generated data representation are utilized to subsequently train a machine learning algorithm to recognize the specific sound source during autonomous driving of the ADV in real-time.

Other aspects relate to a non-transitory machine-readable medium and a system for sound source detection and localization that perform similar operations to the aspect described above and are described in more detail herein below.

Figure 1:
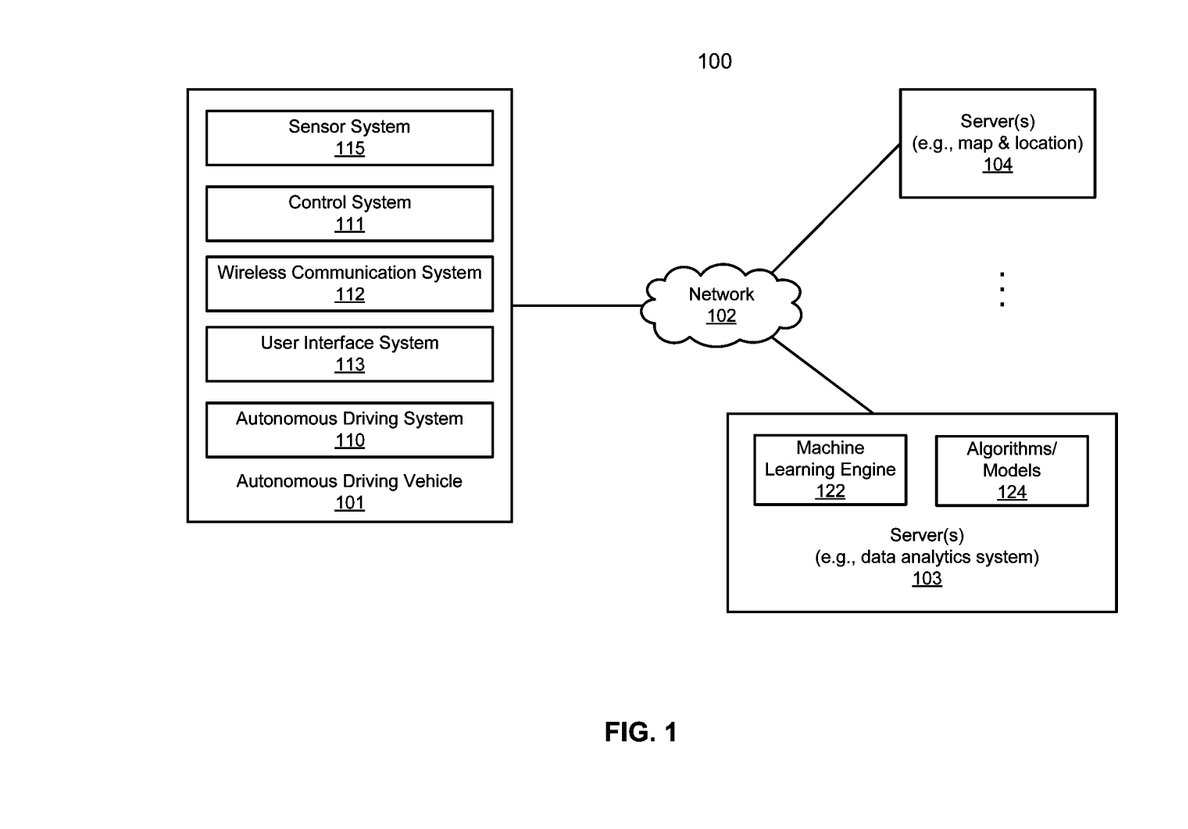
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
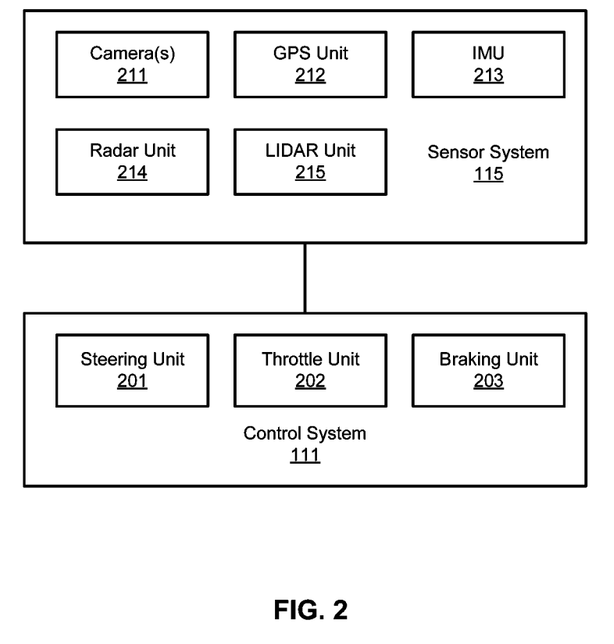
FIG. 2 is a block diagram illustrating an example of an autonomous driving vehicle (ADV) according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes machine learning engine 122. As described in more detail herein below, machine learning engine 122 generates or trains a set of rules, algorithms, and/or predictive models 124 for a variety of purposes, such as detection and localization of one or multiple sound sources (e.g., emergency vehicles) for motion planning and control. Algorithms 124 can then be uploaded on ADVs to be utilized during autonomous driving in real-time.

Figure 3A:
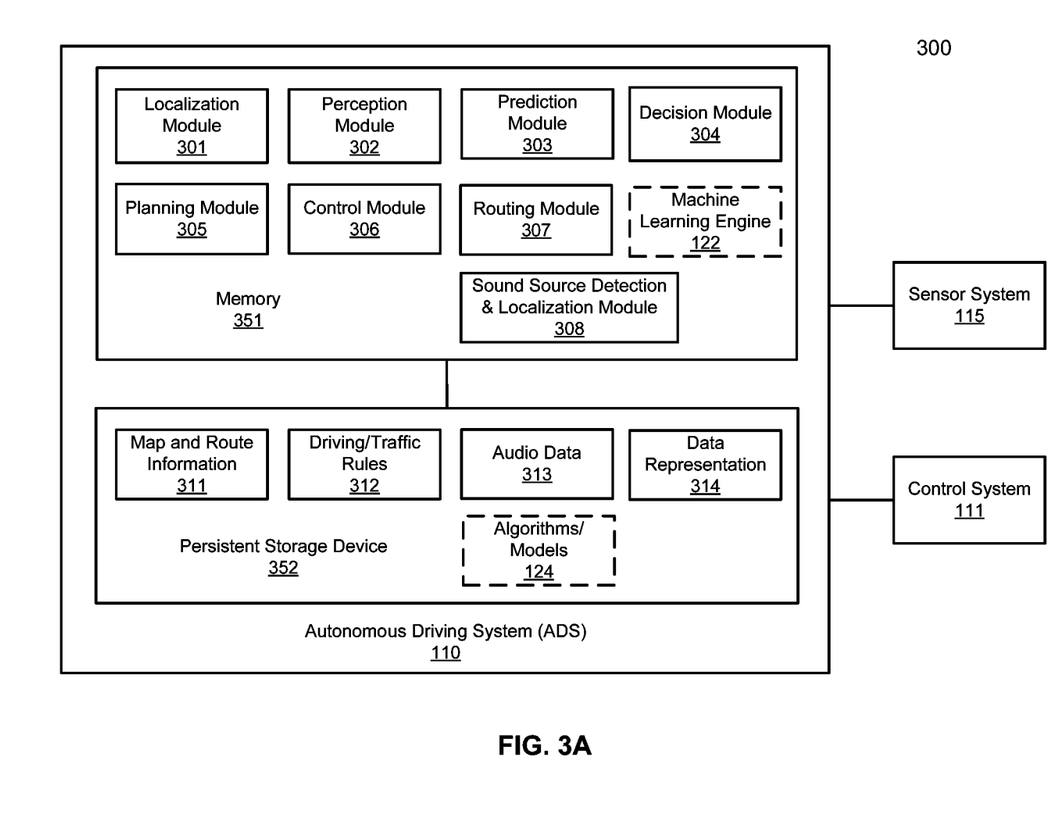
FIGS. 3A-3B are block diagrams illustrating an example of an autonomous driving system used with an autonomous driving vehicle according to one embodiment.
Figure 3B:
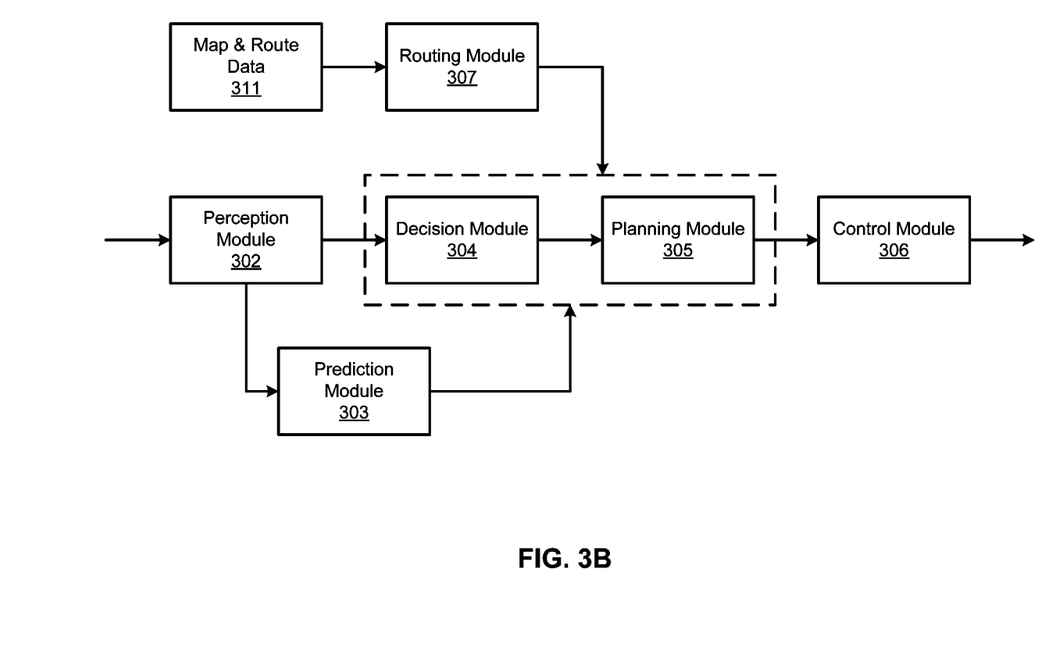

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and sound source detection and localization 308. In some embodiments, ADS 110 may also include machine learning engine 122, though machine learning engine 122 may be installed on a remote server, such as server 103 (as previously described).

Some or all of modules 301-308 (and engine 122, in some embodiments) may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 (and engine 122, in an embodiment) may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4A:
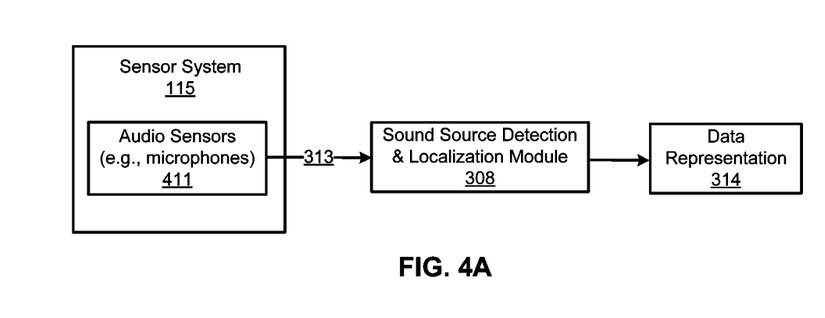
FIGS. 4A-4B are block diagrams illustrating a system for sound source detection and localization according to one embodiment.
Figure 4B:
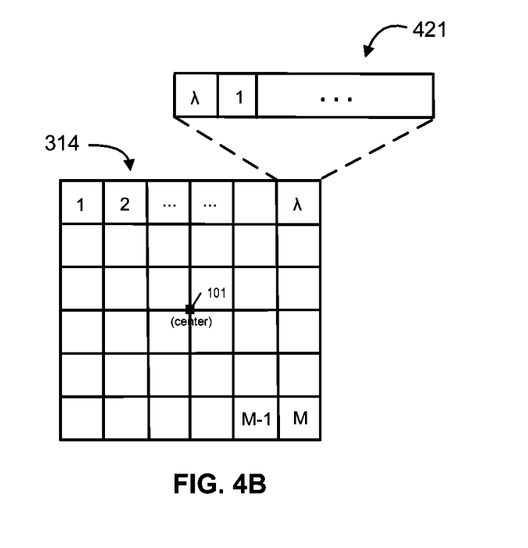

With continued reference to FIG. 3A and also FIGS. 4A-4B (which are block diagrams illustrating a system for sound source detection and localization according to one embodiment), sound source detection and localization module 308 may receive audio data 313 provided by audio sensors 411 (e.g., microphones or microphone array) of sensor system 115. Audio data 313 may include recorded or captured sound emitted by one or multiple sound sources (or objects) at different points in time while the ADV is operating along a route. As shown in FIG. 3A, audio data 313 may be stored in persistent storage device 352. In one embodiment, a sound source (or object) may be an emergency vehicle, such as an ambulance, police vehicle, fire truck, etc.

Based on the received or input audio data 313, sound source detection and localization module 308 may determine and produce various sound source information to report whether there exists a specific sound (e.g., siren sound) within a driving environment of the ADV. For example, module 308 may determine confidence scores (or possibilities) for the existence of the specific sound. In one embodiment, the confidence scores can be determined based on the Doppler-effect of the captured sound. Each confidence score may be within a specific range (e.g., 0-1 value), where 0 represents the lowest confidence or possibility and 1 represents the highest confidence or possibility. It is noted that while the 0-1 range is used in this example, this is not limiting and any numerical range may be used to represent the confidence scores.

Using or performing sound source localization with audio sensors 411, module 308 may determine a direction of each sound source relative to a corresponding audio sensor 411 (i.e., the audio sensor 411 that captures the sound produced by the sound source), a distance between the sound source and the corresponding audio sensor, and a relative position of each possible detected sound (or sound source) based on the position of each audio sensor 411 mounted on the ADV. The sound source localization also enables module 308 to determine (or compute) the precise or absolute position of the sound (or sound source), the approaching/departing status of the sound, and/or the intensity of the sound at a current timestamp. Such sound source localization method or technique is generally known to people skilled in the art, and therefore, will not be described in detail herein for brevity sake. In one embodiment, module 308 may produce the sound source information (e.g., confidence scores, direction of sound source, distance between the sound source and audio sensor, relative position of each possible detected sound, precise position of the sound, approaching/departing status of the sound, intensity of the sound, etc.) as part of data representation 314 (e.g., a grid). As shown in FIG. 3A, data representation 314 may be stored in persistent storage device 352.

Turning now to FIG. 4B, data representation 314 may include multiple regions (represented as boxes) that cover a driving environment. data representation 314 serves to report whether there exists a specific sound (e.g., siren sound) within the data representation. In the example shown in FIG. 4B, data representation 314 has a fixed size of M regions where M is an integer greater than 0. Each region (or a subset of regions) may correspond to a particular audio sensor 411 to partially cover the driving environment of the ADV. Data representation 314 can be visualized as a top-down view with the center of the data representation 314 representing the position of the ADV (e.g., ADV 101 of FIG. 1). In some embodiments, each region of data representation 314 is configured to cover a particular size in the driving environment, such as 5×5 square meter ($m^2$) or 10×10 $m^2$, though this is not limiting. In one embodiment, each region of data representation 314 reports a vector of results 421 to indicate whether the specific sound exists in the region. Each vector 421 may include, but not limited to, a region identifier (ID) and the sound source information (as previously described).

Figure 5:
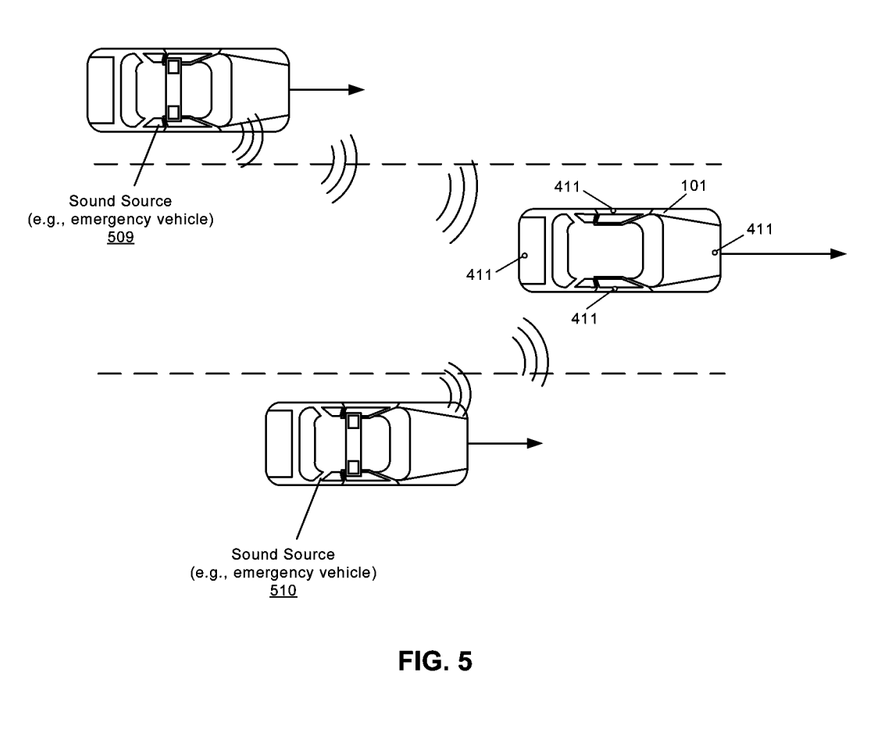
FIG. 5 is a diagram illustrating an example driving scenario with the use of the system for sound source detection and localization according to one embodiment.

FIG. 5 is a diagram illustrating an example driving scenario with the use of the system for sound source detection and localization according to one embodiment. Referring to FIG. 5, ADV 101 may include a number of audio sensors 411 (e.g., a microphone array) mounted around the ADV (e.g., left side, right side, front, and rear), though the number of audio sensors is not limiting. While ADV 101 is driving along a route, one or multiple audio sensors 411 may detect multiple sounds produced from sound sources 509-510 (e.g., police vehicle, ambulance, fire truck, etc.), respectively. As an example, assume that rear audio sensor 411 fully detects the sound produced from sound source 509, while each of the remaining audio sensors only partially detects or fails to detect the sound. In this scenario, the confidence score of the data representation region(s) associated with the rear audio sensor 411 would be closer to the value of 1, whereas the confidence scores associated with the remaining sensors would be closer to the value of 0. Also, using sound source localization (as previously described), a direction of sound source 509 relative to rear audio sensor 411, a distance between the sound source 509 and the rear audio sensor 411, and a relative position of the sound produced by sound source 509 can be determined. The precise or absolute position of the sound produced by sound source 509, the approaching/departing status of the sound, and/or the intensity of the sound at a current timestamp can also be determined.

Concurrently, assume that right (or passenger side) audio sensor 411 fully detects the sound produced from sound source 510, while each of the remaining audio sensors only partially detects or fails to detect the sound. In this scenario, the confidence score of the data representation region(s) associated with the right audio sensor 411 would be closer to the value of 1, whereas the confidence scores associated with the remaining sensors would be closer to the value of 0. Also, using sound source localization (as previously described), a direction of sound source 510 relative to right audio sensor 411, a distance between the sound source 510 and the right audio sensor 411, and a relative position of the sound produced by sound source 510 can be determined. The precise or absolute position of the sound produced by sound source 510, the approaching/departing status of the sound, and/or the intensity of the sound at a current timestamp can also be determined.

Figure 6A:
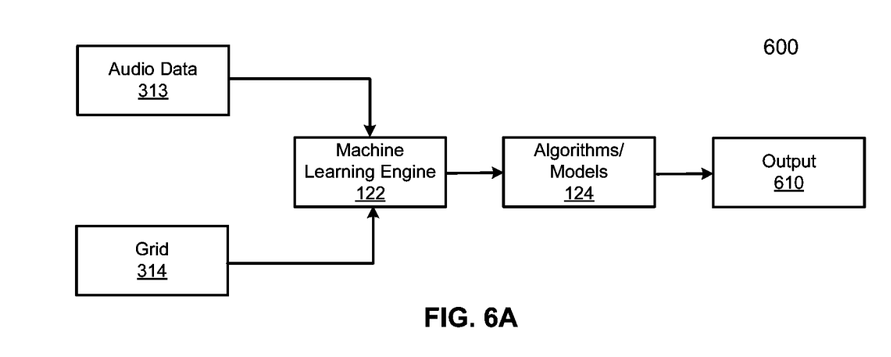
FIGS. 6A-6B are block diagrams illustrating a system of training machine learning algorithms/models according to one embodiment.
Figure 6B:
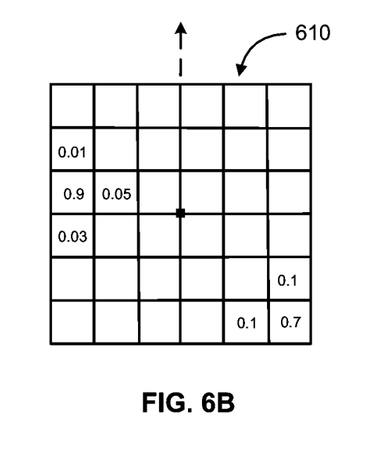

FIGS. 6A-6B are block diagrams illustrating a system of training machine learning algorithms/models according to one embodiment. Referring to FIG. 6A, input audio data 313 and output data representation 314 (produced by sound source detection and localization module 308) may be provided to machine learning 122 to generate or train a set of rules, algorithms, and/or predictive models 124 for the detection and localization of one or multiple sound sources (e.g., emergency vehicles) for motion planning and control. Algorithms/models 124 (e.g., deep neural networks, convolutional deep neural networks, deep belief networks and/or recurrent neural networks) can generalize and find the relations between the input audio data 313 and audio labels (e.g., label indicating a specific sound, such as siren sound) to generate output 610. In one embodiment, algorithms/models 124 may be store in persistent storage device 352 or on a remote server (e.g., server 103).

Referring to FIG. 6B, output 610 may be represented as a data representation (e.g., a grid), with confidence scores and/or sound source information (not shown) populating in certain regions of the data representation. In the example of FIG. 6B, the specific sound (e.g., siren sound) is likely to exist in the regions having confidence scores of 0.7 and 0.9 (which may be a Gaussian distribution), with the front of the ADV facing north towards the dashed arrow. Thus, it can be determined that a siren sound originates to the left and another to the right rear of the ADV.

In one embodiment, algorithms/models 124 can then be uploaded on ADVs to be utilized during autonomous driving in real-time. That is, output 610 produced by models 124 may be used by ADS 110 to generate communication signals and/or commands to operate the ADV accordingly when a specific sound is detected. For example, when one or multiple siren sounds are detected, ADS 110 may control the ADV to stop or pull over to a safe location within the ADV's driving environment based on the sound source information from each region in the data representation (output 610).

Figure 7:
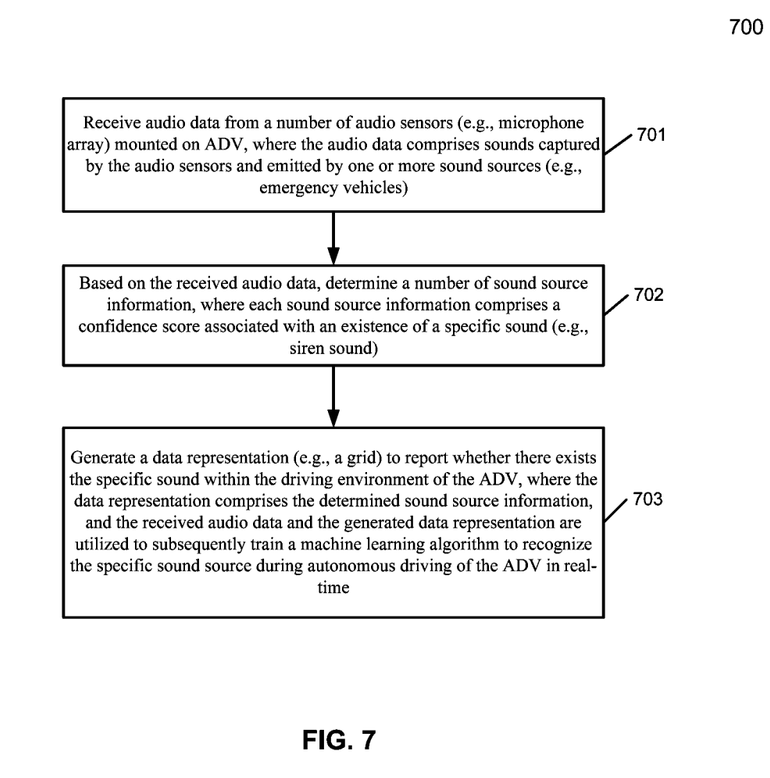
FIG. 7 is a flow diagram of an example method for sound source detection and localization utilizing an ADV according to one embodiment.

FIG. 7 is a flow diagram of an example method for sound source detection and localization utilizing an ADV according to one embodiment. Method or process 700 may be performed by processing logic which may include software, hardware, or a combination thereof. For example, process 700 may be performed by ADS 110 of FIG. 1.

Referring to FIG. 7, at block 701, the processing logic receives audio data from a number of audio sensors (e.g., microphone array) mounted on the ADV. The audio data comprises sounds captured by the audio sensors and emitted by one or more sound sources (e.g., emergency vehicles). At block 702, based on the received audio data, the processing logic determines a number of sound source information. Each sound source information comprises a confidence score associated with an existence of a specific sound (e.g., siren sound). At block 703, the processing logic generates a data representation (e.g., a grid) to report whether there exists the specific sound within the driving environment of the ADV. The data representation comprises the determined sound source information. The received audio data and the generated data representation are utilized to subsequently train a machine learning algorithm to recognize the specific sound source during autonomous driving of the ADV in real-time.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for sound source detection and localization utilizing an autonomous driving vehicle (ADV) while the ADV is operating within a driving environment, the method comprising:
   receiving audio data from a plurality of audio sensors mounted on the ADV, the audio data comprising sounds captured by the plurality of audio sensors and emitted by one or more sound sources;
   based on the received audio data, determining a plurality of sound source information, each sound source information comprising a confidence score associated with an existence of a specific sound; and
   generating a data representation to report whether there exists the specific sound within the driving environment of the ADV, the data representation comprising the determined plurality of sound source information;
   wherein the received audio data and the generated data representation are utilized to subsequently train a machine learning algorithm to recognize a specific sound source during autonomous driving of the ADV in real-time.

2. The method of claim 1, wherein
   determining the plurality of sound source information comprises performing sound source localization with the plurality of audio sensors to determine at least one of: directions of the sound sources relative to their corresponding audio sensors, distances between the sound sources and their corresponding audio sensors, relative positions of the captured sounds, absolute positions of the captured sounds, approaching/departing statuses of the captured sounds, or intensities of the captured sounds associated with current timestamps.

3. The method of claim 2, wherein each sound source information further comprises at least one of: a direction of a sound source relative to a corresponding audio sensor, a distance between the sound source and the corresponding audio sensor, a relative position of a captured sound, an absolute position of a captured sound, an approaching/departing status of a captured sound, or an intensity of a captured sound associated with a current timestamp.

4. The method of claim 3, wherein the data representation is a grid including a plurality of regions that collectively cover the driving environment of the ADV, each region corresponding to an audio sensor from the plurality of audio sensors and reporting a vector of results indicating whether the specific sound exists in the region, the vector of results including a region identifier (ID) and one sound source information.

5. The method of claim 4, wherein each region is configured to partially cover a particular size within the driving environment.

6. The method of claim 1, wherein the sound sources are emergency vehicles, and the specific sound is a siren sound.

7. The method of claim 1, wherein the confidence score is within a range of 0-1 value.

8. The method of claim 4, wherein a center of the grid represents a position of the ADV.

9. A non-transitory machine-readable medium having instructions stored therein, which when executed by a processor, cause the processor to perform operations, the operations comprising:
   receiving audio data from a plurality of audio sensors mounted on an autonomous driving vehicle (ADV), the audio data comprising sounds captured by the plurality of audio sensors and emitted by one or more sound sources;
   based on the received audio data, determining a plurality of sound source information, each sound source information comprising a confidence score associated with an existence of a specific sound; and
   generating a data representation to report whether there exists the specific sound within a driving environment of the ADV, the data representation comprising the determined plurality of sound source information;
   wherein the received audio data and the generated data representation are utilized to subsequently train a machine learning algorithm to recognize a specific sound source during autonomous driving of the ADV in real-time.

10. The non-transitory machine-readable medium of claim 9, wherein
    determining the plurality of sound source information comprises performing sound source localization with the plurality of audio sensors to determine at least one of: directions of the sound sources relative to their corresponding audio sensors, distances between the sound sources and their corresponding audio sensors, relative positions of the captured sounds, absolute positions of the captured sounds, approaching/departing statuses of the captured sounds, or intensities of the captured sounds associated with current timestamps.

11. The non-transitory machine-readable medium of claim 10, wherein each sound source information further comprises at least one of: a direction of a sound source relative to a corresponding audio sensor, a distance between the sound source and the corresponding audio sensor, a relative position of a captured sound, an absolute position of a captured sound, an approaching/departing status of a captured sound, or an intensity of a captured sound associated with a current timestamp.

12. The non-transitory machine-readable medium of claim 11, wherein the data representation is a grid including a plurality of regions that collectively cover the driving environment of the ADV, each region corresponding to an audio sensor from the plurality of audio sensors and reporting a vector of results indicating whether the specific sound exists in the region, the vector of results including a region identifier (ID) and one sound source information.

13. The non-transitory machine-readable medium of claim 12, wherein each region is configured to partially cover a particular size within the driving environment.

14. The non-transitory machine-readable medium of claim 9, wherein the sound sources are emergency vehicles, and the specific sound is a siren sound.

15. The non-transitory machine-readable medium of claim 9, wherein the confidence score is within a range of 0-1 value.

16. The non-transitory machine-readable medium of claim 12, wherein a center of the grid represents a position of the ADV.

17. A system for sound source detection and localization, comprising:
  a processor; and
  a memory coupled to the processor to store instructions, which when executed by the processor, cause the processor to perform operations, the operations including
  receiving audio data from a plurality of audio sensors mounted on an autonomous driving vehicle (ADV), the audio data comprising sounds captured by the plurality of audio sensors and emitted by one or more sound sources;
  based on the received audio data, determining a plurality of sound source information, each sound source information comprising a confidence score associated with an existence of a specific sound; and
  generating a data representation to report whether there exists the specific sound within a driving environment of the ADV, the data representation comprising the determined plurality of sound source information;
  wherein the received audio data and the generated data representation are utilized to subsequently train a machine learning algorithm to recognize a specific sound source during autonomous driving of the ADV in real-time.

18. The system of claim 17, wherein
  determining the plurality of sound source information comprises performing sound source localization with the plurality of audio sensors to determine at least one of: directions of the sound sources relative to their corresponding audio sensors, distances between the sound sources and their corresponding audio sensors, relative positions of the captured sounds, absolute positions of the captured sounds, approaching/departing statuses of the captured sounds, or intensities of the captured sounds associated with current timestamps.

19. The system of claim 18, wherein each sound source information further comprises at least one of: a direction of a sound source relative to a corresponding audio sensor, a distance between the sound source and the corresponding audio sensor, a relative position of a captured sound, an absolute position of a captured sound, an approaching/departing status of a captured sound, or an intensity of a captured sound associated with a current timestamp.

20. The system of claim 19, wherein the data representation is a grid including a plurality of regions that collectively cover the driving environment of the ADV, each region corresponding to an audio sensor from the plurality of audio sensors and reporting a vector of results indicating whether the specific sound exists in the region, the vector of results including a region identifier (ID) and one sound source information.

21. The system of claim 20, wherein each region is configured to partially cover a particular size within the driving environment.

22. The system of claim 17, wherein the sound sources are emergency vehicles, and the specific sound is a siren sound.

23. The system of claim 17, wherein the confidence score is within a range of 0-1 value.

24. The system of claim 20, wherein a center of the grid represents a position of the ADV.

* * * * *